(12) United States Patent
Yang et al.

(10) Patent No.: US 8,774,254 B2
(45) Date of Patent: Jul. 8, 2014

(54) CONTROL CIRCUIT OF FLYBACK POWER CONVERTER WITH BIDIRECTIONAL COMMUNICATION CHANNEL

(75) Inventors: Ru-Shiuan Yang, Hsinchu County (TW); Hung-Chi Chen, Hsinchu (TW)

(73) Assignee: Ru-Shiuan Yang, Hsinchu County (TW)

( * ) Notice: Subject to any disclaimer, the term of this patent is extended or adjusted under 35 U.S.C. 154(b) by 201 days.

(21) Appl. No.: 13/567,097

(22) Filed: Aug. 6, 2012

(65) Prior Publication Data
US 2014/0036550 A1   Feb. 6, 2014

(51) Int. Cl.
*H04B 1/38* (2006.01)

(52) U.S. Cl.
USPC .............................. 375/219; 363/21.15

(58) Field of Classification Search
USPC .............. 363/21.12, 21.15, 97, 131; 375/219, 375/221, 222, 238, 239, 257, 258, 356
See application file for complete search history.

(56) References Cited

U.S. PATENT DOCUMENTS 8,699,243 B2 *   4/2014   Sims et al. ................. 363/21.14

\* cited by examiner

*Primary Examiner* — Gary L Laxton
*Assistant Examiner* — Afework Demisse
(74) *Attorney, Agent, or Firm* — Jianq Chyun IP Office (57) ABSTRACT

A control circuit of an isolated flyback power converter providing bidirectional communication. The control circuit includes a pulse width modulation circuit, an oscillator, a primary transceiver, a secondary error amplifier and a secondary transceiver. The primary transceiver generates a feedback signal and a pulse-position signal. The secondary error amplifier generates an error signal in accordance with an output voltage of the power converter. The secondary transceiver generates a pulse modulation signal for transmitting the data from the secondary side to the primary side, and generates a frequency signal in response to a switching voltage of the transformer. The frequency signal is demodulated as the data transmitted from the primary side to the secondary side. The feedback signal is correlated to the error signal. The pulse-position signal is correlated to the pulse modulation signal. The error signal and the pulse modulation signal are coupled to an input of an optical coupler.

4 Claims, 6 Drawing Sheets

CONTROL CIRCUIT OF FLYBACK POWER CONVERTER WITH BIDIRECTIONAL COMMUNICATION CHANNEL

BACKGROUND OF THE INVENTION

1. Field of the Invention

The invention relates to a switching power converter, and more particularly, to the control circuit of the flyback power converter with communication channel.

2. Description of Related Art

The flyback power converter had been widely used in the computers and home appliances. It provides an isolated power supply for the system. The technology of the flyback power converter is a well developed prior art. However, in recent development, a better power management is requested to meet the power saving requirements. The approach includes using the secondary side's control signal to control the primary side circuits. For example, for achieving a high efficiency operation and a low standby power, the CPU located in the secondary side should be able to control the output voltage of the PFC (power factor correction) converter located in the primary side. Besides, in order to report the power consumption of the system, the parameters such as the input voltage and the input current of the PFC converter should be reported to the CPU. Therefore, an isolated communication channel between the primary side and the secondary side is required.

SUMMARY OF THE INVENTION

The invention is directed to provide a control circuit that can regulate the flyback power converter and provide a bidirectional communication through the isolation barrier.

An exemplary embodiment of the invention provides a control circuit of an isolated flyback power converter providing bidirectional communication. The control circuit includes a pulse width modulation circuit, an oscillator, a primary transceiver, a secondary error amplifier and a secondary transceiver. The pulse width modulation circuit generates a switching signal coupled to switch a transformer for producing an output voltage of the isolated flyback power converter in accordance with a feedback signal. An oscillator generates an oscillation signal for determining a switching frequency of the switching signal. The frequency-shift signal is coupled to modulate the switching frequency for transmitting data from the primary side to the secondary side. The primary transceiver is coupled to an optical coupler for generating the feedback signal and a pulse-position signal. The pulse-position signal is demodulated as data transmitted from the secondary side to the primary side. The secondary error amplifier generates an error signal in accordance with the output voltage of the isolated flyback power converter. The secondary transceiver generates a pulse modulation signal for transmitting the data from the secondary side to the primary side, and the secondary transceiver is coupled to the transformer for generating a frequency signal in response to a switching voltage of the transformer. The frequency signal is demodulated as the data transmitted from the primary side to the secondary side. The feedback signal is correlated to the error signal. The pulse-position signal is correlated to the pulse modulation signal. The error signal and the pulse modulation signal are coupled to an input of the optical coupler.

According to an exemplary embodiment of the invention, the primary transceiver includes a resistor and a switch. The resistor and the switch are coupled to an attenuator of the feedback signal for a feed-forward compensation. The switch is controlled by the frequency-shift signal, and the feed-forward compensation is utilized to compensate the switching signal for reducing an output ripple.

According to an exemplary embodiment of the invention, the primary transceiver generates the pulse-position signal during a first period of the switching signal, and the primary transceiver generates the feedback signal during a second period of the switching signal.

According to an exemplary embodiment of the invention, the frequency signal is coupled to generate a ramp signal, and a peak voltage of the ramp signal determines the data transmitted from the primary side to the secondary side.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
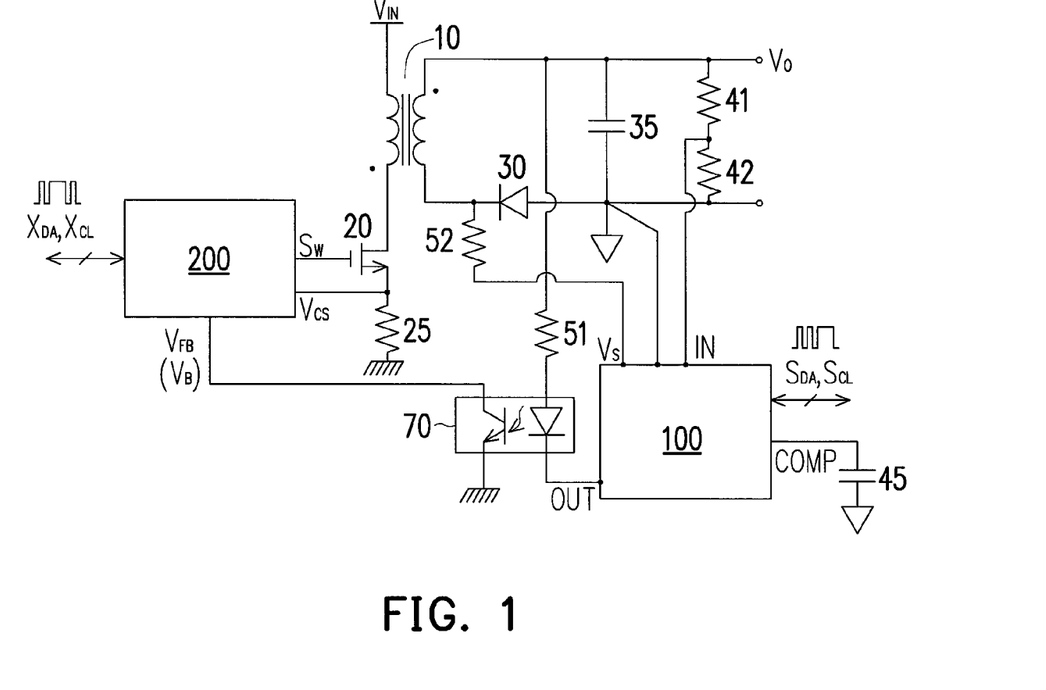
FIG. 1 is a preferred embodiment of a flyback power converter with bidirectional communication channel.

FIG. 1 is a preferred embodiment of a flyback power converter with bidirectional communication channel in accordance with the invention. A primary control circuit 200 generates a switching signal $S_W$ in accordance with a feedback signal $V_B$. The feedback signal $V_B$ is correlated to the output voltage $V_O$ of the power converter. The feedback signal $V_B$ is included in a composing signal $V_{FB}$. The switching signal $S_W$ is coupled to switch a transformer 10 via a transistor 20 for generating the output voltage $V_O$ via a rectifier 30 and an output capacitor 35. A resistor 25 is coupled to sense the switching current of the transformer 10 and generate a current sense signal $V_{CS}$ connected to the primary control circuit 200. The primary control circuit 200 has a serial communication signals $X_{DA}$ and $X_{CL}$ for the interface to the microcontroller. According to the data of the serial communication signals $X_{DA}$ and $X_{CL}$, the primary control circuit 200 modulates the switching frequency of the switching signal $S_W$ for transmitting the data from the primary side to the secondary side. The primary control circuit 200 is further coupled to an optical coupler 70 to receive the composing signal $V_{FB}$ for generating the feedback signal $V_B$ and a pulse-position signal. The pulse-position signal is demodulated as the data transmitted from the secondary side.

A secondary control circuit 100 is coupled to the output of the power converter through resistors 41 and 42 for detecting the output voltage $V_O$ and generating an input signal IN and an error signal COMP. For the feedback loop stability, a capacitor 45 is connected to the error signal COMP for the loop compensation. The secondary control circuit 100 has a serial communication signals $S_{DA}$ and $S_{CL}$, for the interface to the CPU. According to the data of the serial communication signals $S_{DA}$ and $S_{CL}$, the secondary control circuit 100 generates a pulse modulation signal $S_D$ for transmitting the data from the secondary side to the primary side. The error signal COMP and the pulse modulation signal $S_D$ are coupled to the input of the optical coupler 70 for generating the composing signal $V_{FB}$. The secondary control circuit 100 is further coupled to the transformer 10 through a resistor 52 for generating a frequency signal CK in response to a switching voltage $V_S$ of the transformer 10. The frequency signal CK is demodulated as the data transmitted from the primary side.

Figure 2:
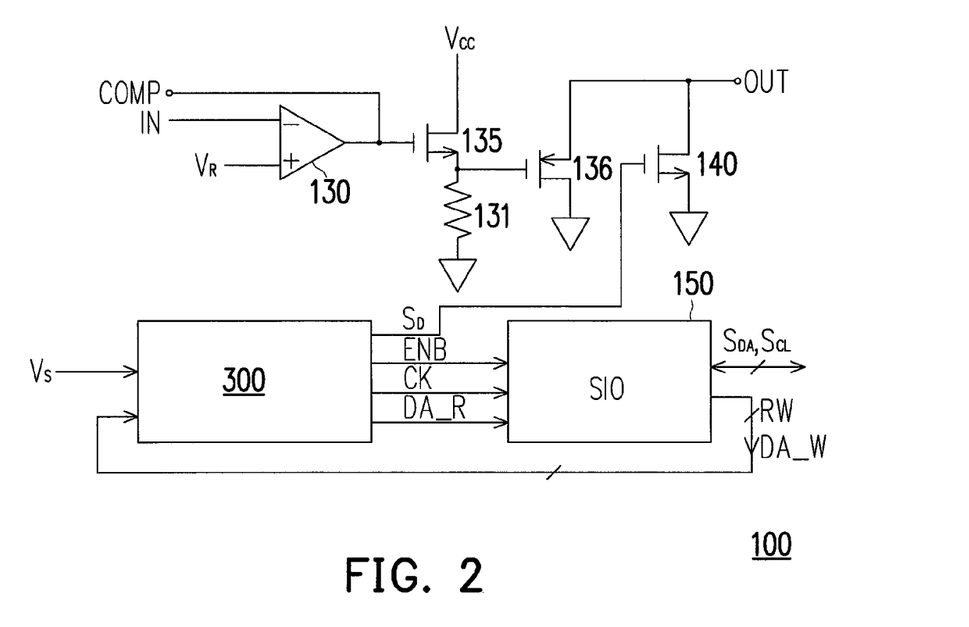
FIG. 2 is a secondary control circuit according to a preferred embodiment of the invention.

FIG. 2 illustrates the secondary control circuit 100 according to the invention. The secondary control circuit 100 includes an error amplifier 130, a driver circuit, a serial interface circuit 150 and a secondary transceiver 300. Transistors 135, 136 and 140 and a resistor 131 develop the driver circuit. The error amplifier 130 generates the error signal COMP in accordance with the input signal IN and a reference voltage $V_R$.

The serial interface circuit 150 is coupled to receive the signals $S_{DA}$ and $S_{CL}$ for generating a read/write signal RW and an output data signal DA_W coupled to the secondary transceiver 300. In accordance with an input data signal DA_R, a frequency signal CK and an enable signal ENB, the serial interface circuit 150 generates the signals $S_{DA}$ and $S_{CL}$ to the CPU. The operation of the serial port interface 150 can be found in the specification of "I²C bus" or the "smart bus".

The secondary transceiver 300 generates the pulse modulation signal $S_D$ in response to the signal RW, the signal DA_W. The error signal COMP and the pulse modulation signal $S_D$ generate a signal OUT via the driver circuit. The transistors 135 and 136 and the resistor 131 form a level-shift buffer for the error signal COMP. The signal OUT is coupled to the input of the optical coupler 70. The secondary transceiver 300 is further coupled to the transformer 10 for detecting the switching voltage $V_S$ and generating the frequency signal CK. The frequency signal CK is demodulated to be the signals DA_R and ENB.

Figure 3:
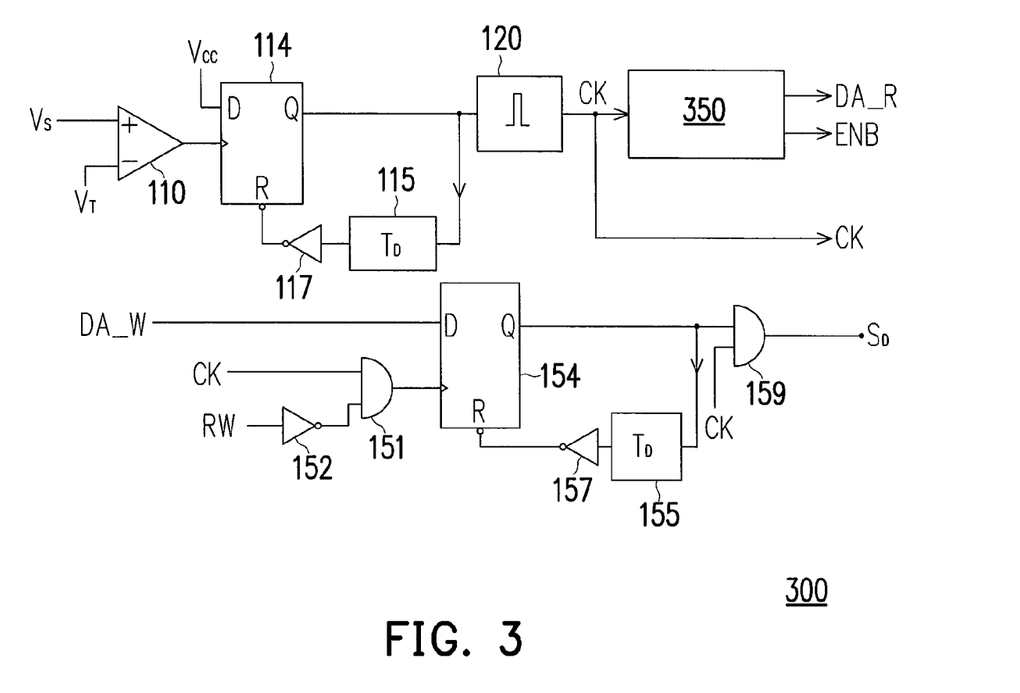
FIG. 3 is a preferred embodiment of a secondary transceiver according to the invention.

FIG. 3 is a preferred embodiment of the secondary transceiver 300. The switching voltage $V_S$ is coupled to a comparator 110 for generating the frequency signal CK through a flip-flop 114 and a pulse generator 120. The pulse width of the frequency signal CK is 3 μsecs (microseconds), for example. The switching voltage $V_S$ will be a high voltage signal in response to the turn-on of the switching signal $S_W$. Once the switching signal $S_W$ is turned off, the energy of the transformer 10 is discharged to the output $V_O$, and the switching voltage $V_S$ is pulled to the ground due to the turn-on of the rectifier 30 (shown in FIG. 1). Therefore, the frequency signal CK is synchronized with the switching signal $S_W$. When the switching voltage $V_S$ is higher than a threshold $V_T$, the flip-flop 114 is turned on. After a delay time, such as 5 μsecs, a delay circuit 115 and an inverter 117 are turned off the flip-flop 114. A secondary receiver 350 generates the signals DA_R and ENB in accordance with the period of the frequency signal CK.

Through an AND gate 151 and an inverter 152, the signal RW (logic-low for the write) and the frequency signal CK are coupled to write the output data signal DA_W into a flip-flop 154. The delay circuit 155 and an inverter 157 are applied to reset the flip-flop 154. The output of the flip-flop 154 associated with the frequency signal CK generates the pulse modulation signal $S_D$ via an AND gate 159. Thus, the pulse modulation signal $S_D$ is synchronized with the frequency signal CK.

Figure 4:
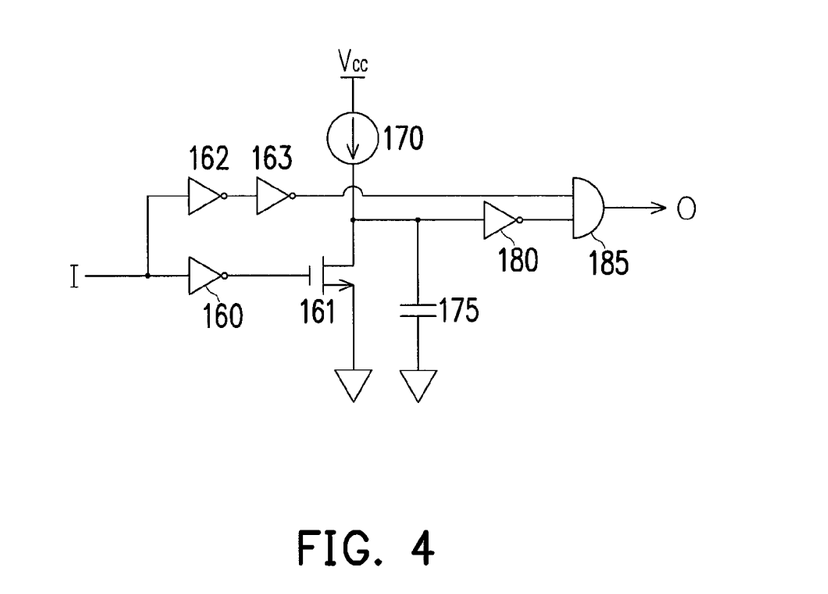
FIG. 4 illustrates a circuit schematic of a pulse generator.

FIG. 4 shows a reference circuit for the pulse generator, such as the pulse generator 120, etc. A constant current source 170 and a capacitor 175 determine the pulse width of the output signal of the pulse generator.

Figure 5:
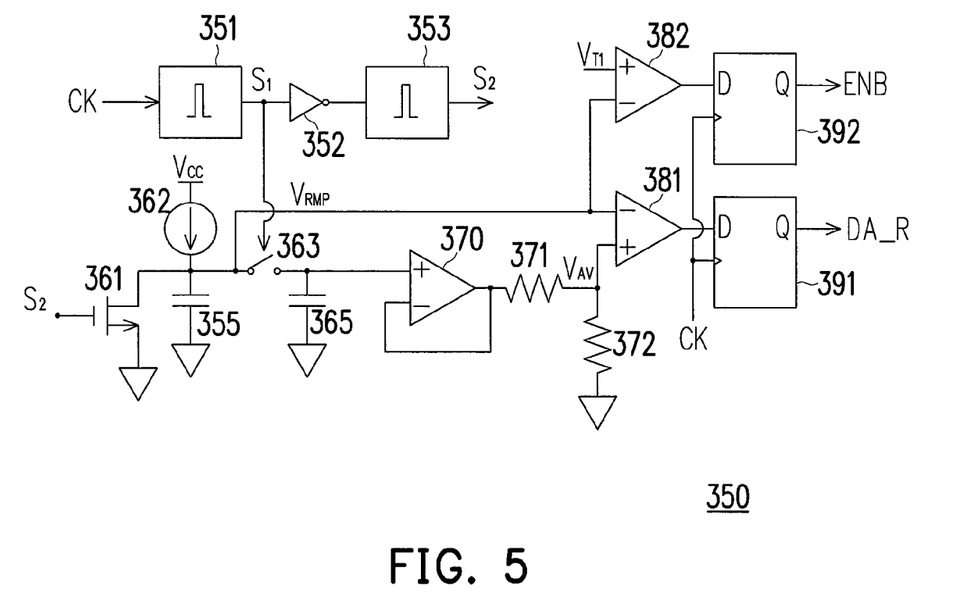
FIG. 5 is a preferred embodiment of a secondary receiver according to the invention.

FIG. 5 is a preferred embodiment of the secondary receiver 350. The frequency signal CK generates a pulse signal S1, and then generates another pulse signal S2 through an inverter 352 and pulse generators 351 and 353. The signal S2 is coupled to discharge a capacitor 355 via a transistor 361. Before the discharge of the capacitor 355, the signal S1 samples the voltage of the capacitor 355 to a capacitor 365 via a switch 363. After the discharge, a current source 362 charges the capacitor 355 and generates a ramp signal $V_{RMP}$. A shorter period (higher frequency) frequency signal CK generates a lower peak voltage of the ramp signal $V_{RMP}$. A longer period (lower frequency) frequency signal CK generates a higher peak voltage of the ramp signal $V_{RMP}$. Thus, after several switching cycles of the switching signal $S_W$, the capacitor 365 stores an average value of the peak voltage of the ramp signal $V_{RMP}$. The capacitor 365 is couple to generate a voltage $V_{AV}$ through a buffer amplifier 370 and resistors 371 and 372. A comparator 381 receives the voltage $V_{AV}$ and the ramp signal $V_{RMP}$ for generating the input data signal DA_R through a flip-flop 391. A comparator 382 receives the ramp signal $V_{RMP}$ and a threshold $V_{T1}$ for generating the enable signal ENB through a flip-flop 392. The rising edge of the frequency signal CK is utilized to clock the flip-flops 391 and 392. The enable signal ENB indicates the period of the frequency signal CK is under a specific value and indicates the input data signal DA_R is an available value. A long switching period of the switching signal $S_W$ might be generated during the no load condition of the flyback power converter, in which a burst switching is produced for regulating the output voltage $V_O$.

Figure 6:
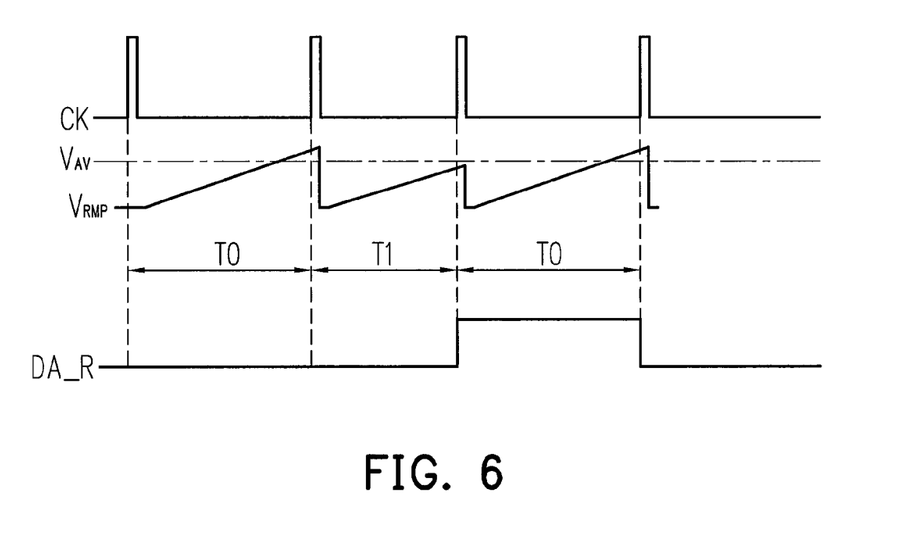
FIG. 6 shows control signal's waveforms of the secondary receiver.

FIG. 6 shows the waveforms of the signals CK, $V_{RMP}$, $V_{AV}$ and DA_R. The period T0 is a logic-low data sending from the primary side to the secondary side. The period T1 is a higher frequency of the frequency signal CK, and the period T1 indicates a logic-high data. The period T0 and period T1 are synchronized by the frequency signal CK for the generation of the input data signal DA_R.

Figure 7:
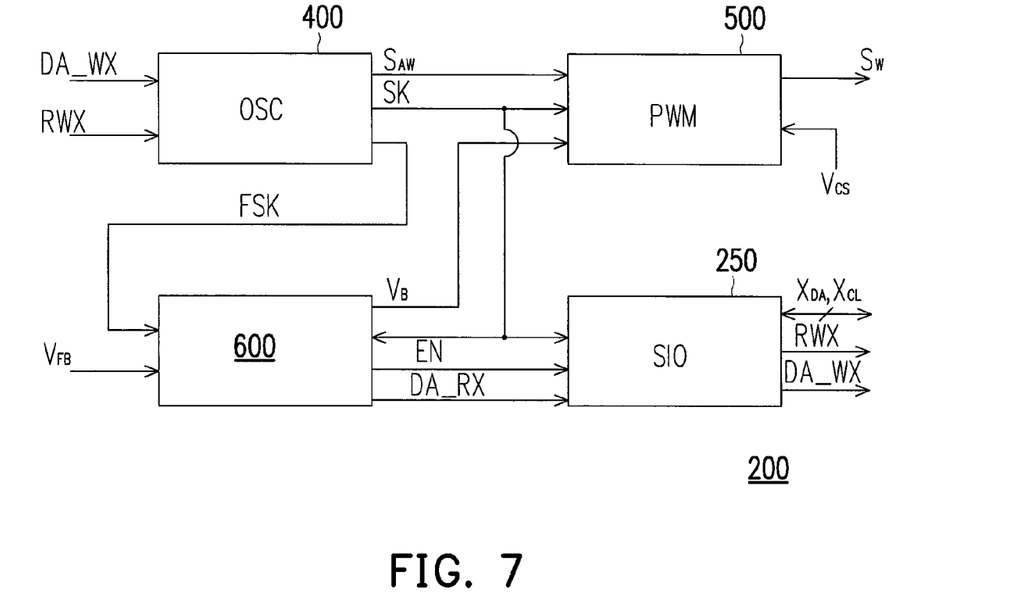
FIG. 7 is a primary control circuit according to a preferred embodiment of the invention.

FIG. 7 is a preferred embodiment of the primary control circuit 200. FIG. 7 includes a serial interface circuit 250, an oscillator 400, a PWM circuit 500, and a primary transceiver 600. The serial interface circuit 250 is coupled to receive the signals $X_{DA}$ and $X_{CL}$ for generating a read/write signal RWX and an output data signal DA_WX coupled to the oscillator 400. In accordance with an input data signal DA_RX, an oscillation signal $S_K$ and an enable signal EN, the serial interface circuit 250 generates the signals $X_{DA}$ and $X_{CL}$ to the microcontroller.

The PWM circuit 500 generates a switching signal $S_W$ in accordance with the feedback signal $V_B$, a current sense signal $V_{CS}$, a saw-tooth signal $S_{AW}$ and the oscillation signal $S_K$. The oscillator 400 generates the saw-tooth signal $S_{AW}$ and the oscillation signal $S_K$ for determining the switching frequency of the switching signal $S_W$. According to the signals RWX and DA_WX, the oscillator 400 generates a frequency-shift signal FSK to modulate the switching frequency of the switching signal $S_W$ for transmitting the data from the primary side to the secondary side. The primary transceiver 600 is coupled to receive the composing signal $V_{FB}$. The composing signal $V_{FB}$ is demodulated to be the input data signal DA_RX. The primary transceiver 600 further includes a feed-forward compensation for compensating the switching signal $S_W$. The feed-forward compensation is utilized to reduce the output ripple caused by the switching frequency modulation.

Figure 8:
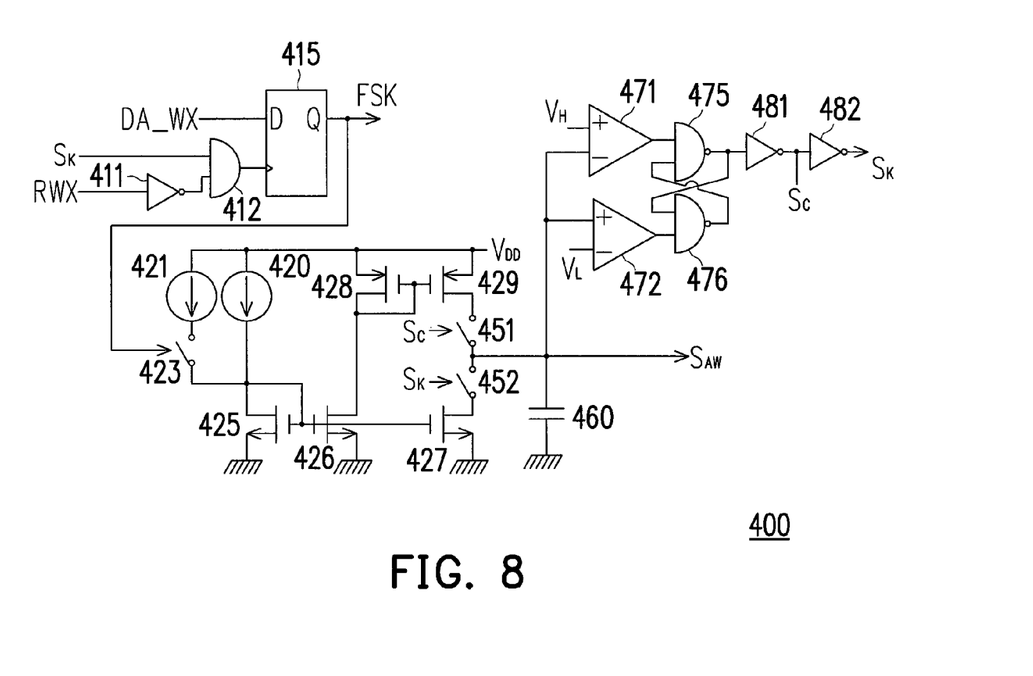
FIG. 8 illustrates a circuit schematic of an oscillator of the primary control circuit.

FIG. 8 illustrates the circuit schematic of the oscillator 400. Through an AND gate 412 and an inverter 411, the signal RWX (logic-low for the write) and the oscillation signal $S_K$ are coupled to write the output data signal DA_WX into a flip-flop 415 for generating the frequency-shift signal FSK. The frequency-shift signal FSK is coupled to control a current source 421 via a switch 423. A current source 420 and the current source 421 determine a charge current and a discharge current for a capacitor 460 through transistors 425, 426, 427, 428 and 429 and switches 451 and 452. The transistor 427 generates the discharge current $I_D$ coupled to the capacitor 460 via the switch 452. The transistor 429 generates the charge current $I_C$ coupled to charge the capacitor via the switch 451. The switch 451 is controlled by a charge signal $S_C$. The switch 452 is controlled by the oscillation signal $S_K$. A comparator 471 has a trip-point signal $V_H$. A comparator 472 has a trip-point signal $V_L$, in which the level of the trip-point signal $V_H$ is higher than that of the trip-point signal $V_L$. Comparators 471 and 472 are coupled to the capacitor 460 for generating the charge signal $S_C$ and the oscillation signal $S_K$ through NAND gates 475 and 476 and inverter 481 and 482. The level of the trip-point signals $V_H$ and $V_L$, the current of the current sources 420 and 421 and the capacitance $C_{460}$ of the capacitor 460 decide the frequency $F_{SK}$ of the oscillation signal $S_K$, $$F_{SK} = \frac{1}{T_C + T_D}$$

$$T_C = \frac{C_{460} \times (V_H - V_L)}{I_C}$$

$$T_D = \frac{C_{460} \times (V_H - V_L)}{I_D}$$

where $T_C$ is the charge period, $T_D$ is the discharge period, and the charge current $I_C$ and discharge $I_D$ are determined by the current of the current sources 420 and 421.

Figure 9:
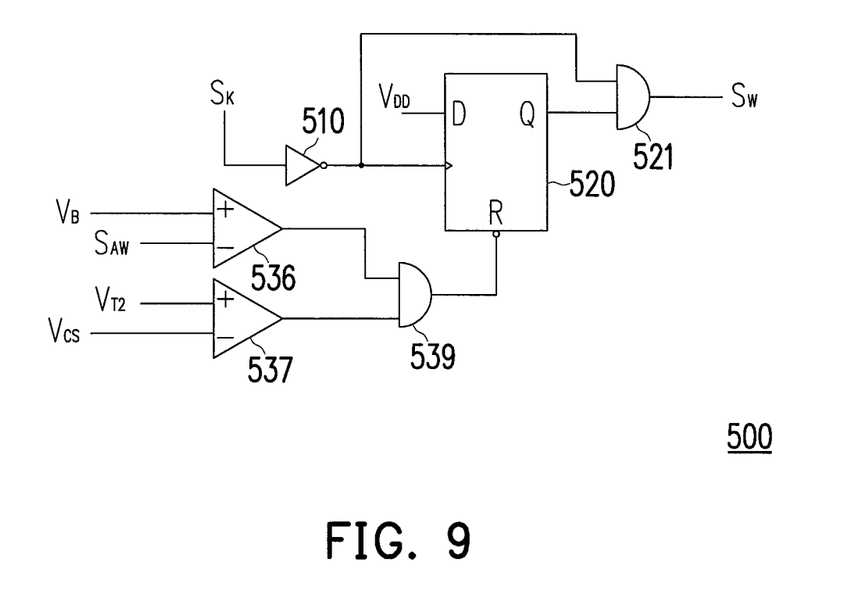
FIG. 9 shows a reference design for a PWM circuit.

FIG. 9 shows a reference design for the PWM circuit 500. The oscillation signal $S_K$ is coupled to turned on a flip-flop 520 via an inverter 510. The output of the flip-flop 520 generates the switching signal $S_W$ through an AND gate 521. The oscillation signal $S_K$ is connected to the AND gate 521 via the inverter 510 for providing a dead-time for the switching signal $S_W$. When the saw-tooth signal $S_{AW}$ is higher than the feedback signal $V_B$, a comparator 536 generates a reset signal to reset the flip-flop 520 via an AND gate 539. For an over-current protection, the switching signal $S_W$ is turned off when the current sense signal $V_{CS}$ is higher than a current-limit threshold $V_{T2}$. A comparator 537 generates another reset signal to reset the flip-flop 520 via the AND gate 539. For a current mode control, the saw-tooth signal $S_{AW}$ applied to the comparator 536 can be replaced by the current sense signal $V_{CS}$.

Figure 10:
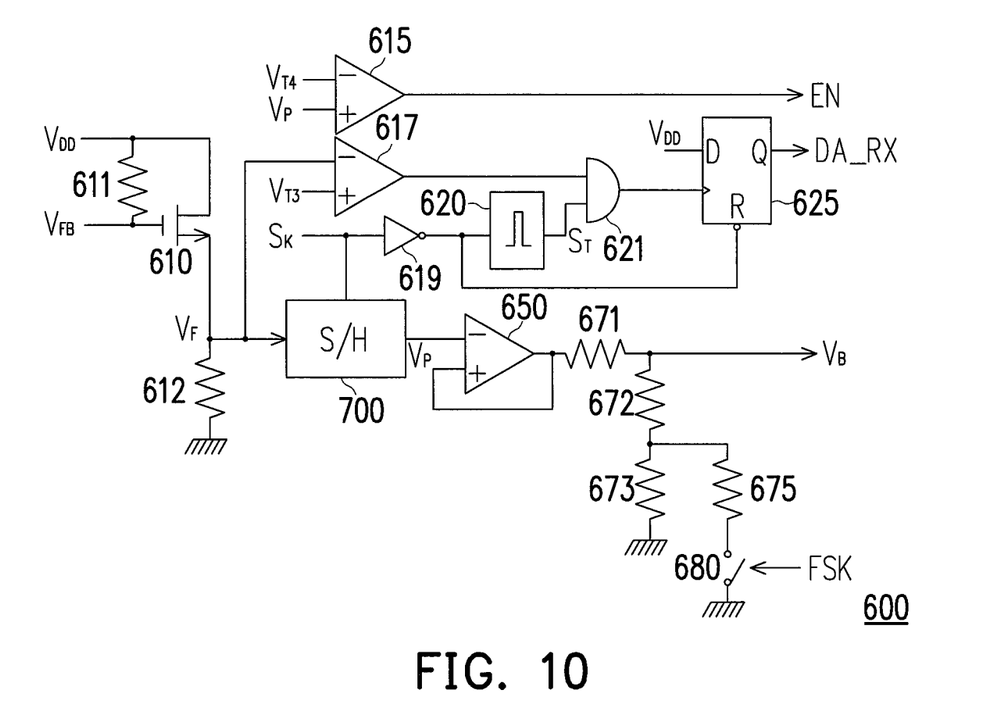
FIG. 10 is a preferred embodiment of a primary transceiver according to the invention.

FIG. 10 is a preferred embodiment of the primary transceiver 600 according to the invention. A transistor 610 and resistors 611 and 612 develop a level-shift buffer for generating a level-shift composing signal $V_F$ according to the composing signal $V_{FB}$. A comparator 617 compares the signal $V_F$ with a threshold $V_{T3}$. The output of the comparator 617 is coupled to generate the input data signal DA_RX through a flip-flop 625 and an AND gate 621. The oscillation signal $S_K$ generates an available period signal $S_T$ though an inverter 619 and a pulse generator 620. This is a time sharing approach. The period of the oscillation signal $S_K$ is the same as the period of the switching signal $S_W$. Therefore, a first period of the switching signal $S_W$ is used for detecting the pulse-position signal in the composing signal $V_F$. The available period signal $S_T$ is generated in the first period of the switching signal $S_W$. A second period of the switching signal $S_W$ is applied to sample the level of the composing signal $V_F$ for generating a feedback signal $V_P$ through a sample-hold circuit 700. The feedback signal $V_P$ is connected to a comparator 615. The comparator 615 generates the enable signal EN only when the feedback signal $V_P$ is higher than a threshold $V_{T4}$. It indicates the input data signal DA_RX may be not reliable when the feedback signal $V_P$ is too low.

A buffer amplifier 650 and resistors 671, 672 and 673 develop an attenuator to generate the feedback signal $V_B$ in accordance with the signal $V_F$. A resistor 675 is applied to the attenuator via a switch 680 to decrease the feedback signal $V_B$ in response to the frequency-shift signal FSK. The decrease of the feedback signal $V_B$ reduces the on-time $T_{ON}$ of the switching signal $S_W$.

When the transistor 20 (FIG. 1) is turned on, the energy E stored into the transformer 10 is given by, $$\varepsilon = \frac{1}{2} \times L_P \times I_P^2. \quad (1)$$

The primary switching current $I_P$ of the transformer 10 is, $$I_P = \frac{V_{IN}}{L_P} \times T_{ON}. \quad (2)$$

Therefore the equation (1) can be rewritten as, $$P = V_o \times I_o = \frac{V_{IN}^2 \times T_{ON}^2}{2 \times L_P \times T} \quad (3)$$

where $L_P$ is the inductance of the primary winding of the transformer 10, T is the switching period of the switching signal $S_W$, $T_{ON}$ is the on-time of the switching signal $S_W$, $V_O$ is the output voltage, $I_O$ is the output current, and $V_{IN}$ is the input voltage of the transformer 10.

When the frequency-shift signal FSK is enabled to increase the frequency for the data transmission, the switching period T is reduced by $\Delta T$. The output power P and the output voltage $V_O$ is increased as shown in the equation (3). A feed-forward compensation for the frequency modulation is developed to reduce the output ripple caused by the frequency-shift signal FSK. The feed-forward compensation decreases the feedback signal $V_B$ and decreases the on-time $T_{ON}$ of the switching signal $S_W$ in response to the enable of the frequency-shift signal FSK. The decrease of the on-time $T_{ON}$ of the switching signal $S_W$ is expressed as $\Delta T_{ON}$. The equation (4) shows the feed-forward compensation for the frequency modulation.

$$P = \frac{V_{IN}^2 \times T_{ON}^2}{2 \times L_P \times T} = \frac{V_{IN}^2 \times (T_{ON} - \Delta T_{ON})^2}{2 \times L_P \times (T - \Delta T)} \quad (4)$$

The equation (4) can be rewritten as the equation (5) and the equation (6).

$$\frac{T_{ON}^2}{T} = \frac{(T_{ON} - \Delta T_{ON})^2}{T - \Delta T} \quad (5)$$

$$T_{ON}^2 \times T - T_{ON}^2 \times \Delta T = T \times T_{ON}^2 - 2 \times T \times T_{ON} \times \Delta T_{ON} + T \times \Delta T_{ON}^2 \quad (6)$$
$$T_{ON}^2 \times \Delta T = 2 \times T \times T_{ON} \times \Delta T_{ON} - T \times \Delta T_{ON}^2$$

Because $$T >> \Delta T;\ T > T_{ON};\ T_{ON} >> \Delta T_{ON}.$$

The equation (6) can be expressed as, $$T_{ON}^2 \times \Delta T \approx 2 \times T \times T_{ON} \times \Delta T_{ON} \quad (7)$$

$$\Delta T_{ON} \approx \frac{T_{ON}}{2 \times T} \times \Delta T. \quad (8)$$

When the switching frequency is increased for the data transmission, the on-time $T_{ON}$ is reduced accordingly, and thus the output power P and the output voltage $V_O$ can be keep as a constant.

Figure 11:
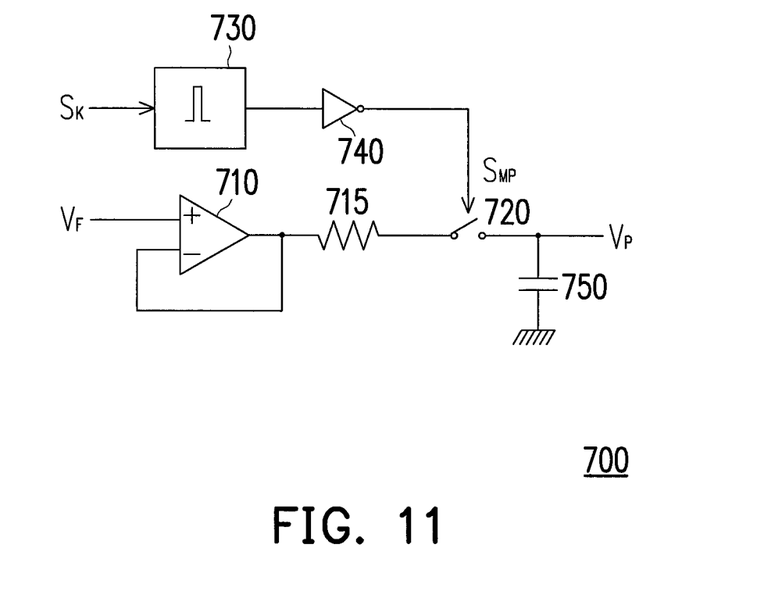
FIG. 11 shows a sample-hold circuit of the primary transceiver.

FIG. 11 shows the sample-hold circuit 700. A buffer amplifier 710 is coupled to sample the composing signal $V_F$ into a capacitor 750 via a resistor 715 and a switch 720, and generate the feedback signal $V_P$ in the capacitor 750. The oscillation signal $S_K$ generates a sample signal $S_{MP}$ through a pulse generator 730 and an inverter 740. The sample signal $S_{MP}$ turns on the switch 720 for sampling the feedback signal during the second period of the switching signal $S_W$.

Figure 12:
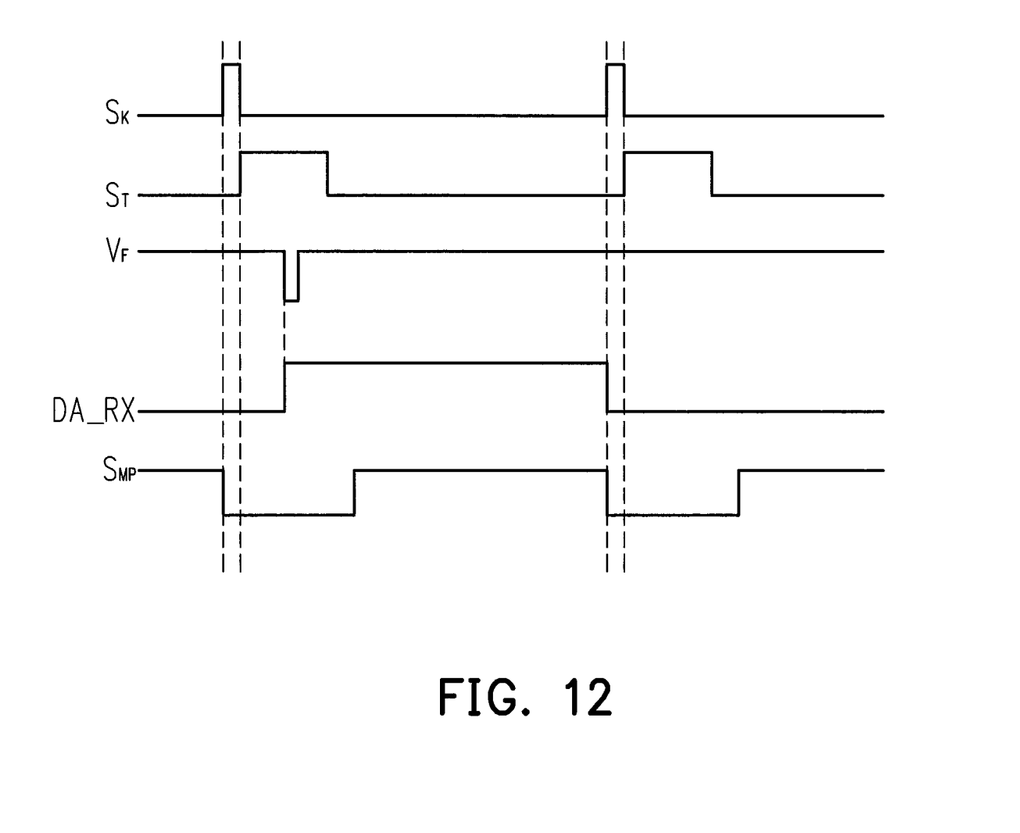
FIG. 12 shows control signal's waveforms of the primary transceiver and the sample-hold circuit.

FIG. 12 shows the waveforms of the signals $S_K$, $S_T$, $V_F$, $S_{MP}$ and DA_RX. The available period signal $S_T$ is developed in the first period of the switching signal $S_W$ for detecting the pulse-position signal in the composing signal $V_F$ and generating the input data signal DA_RX accordingly. The sample signal $S_{MP}$ is developed in the second period of the switching signal $S_W$ for sampling the level of the composing signal $V_F$ and generating the feedback signal $V_P$.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims or their equivalents.

What is claimed is:

1. A control circuit of an isolated flyback power converter providing bidirectional communication comprising:
   a pulse width modulation circuit generating a switching signal coupled to switch a transformer for producing an output voltage of the isolated flyback power converter in accordance with a feedback signal;
   an oscillator generating an oscillation signal for determining a switching frequency of the switching signal, wherein a frequency-shift signal is coupled to modulate the switching frequency for transmitting data from the primary side to the secondary side;
   a primary transceiver coupled to an optical coupler for generating the feedback signal and a pulse-position signal, wherein the pulse-position signal is demodulated as data transmitted from the secondary side to the primary side;
   a secondary error amplifier generating an error signal in accordance with the output voltage of the isolated flyback power converter; and
   a secondary transceiver generating a pulse modulation signal for transmitting the data from the secondary side to the primary side and coupled to the transformer for generating a frequency signal in response to a switching voltage of the transformer,
   wherein the frequency signal is demodulated as the data transmitted from the primary side to the secondary side, the feedback signal is correlated to the error signal, the pulse-position signal is correlated to the pulse modulation signal, and the error signal and the pulse modulation signal are coupled to an input of the optical coupler.

2. The control circuit as claimed in claim 1, wherein the primary transceiver comprises:
   a resistor and a switch coupled to an attenuator of the feedback signal for a feed-forward compensation,
   wherein the switch is controlled by the frequency-shift signal, and the feed-forward compensation is utilized to compensate the switching signal for reducing an output ripple.

3. The control circuit as claimed in claim 1, wherein the primary transceiver generates the pulse-position signal during a first period of the switching signal, and the primary transceiver generates the feedback signal during a second period of the switching signal.

4. The control circuit as claimed in claim 1, wherein the frequency signal is coupled to generate a ramp signal, and a peak voltage of the ramp signal determines the data transmitted from the primary side to the secondary side.

* * * * *